(12) United States Patent
Kundu et al.

(10) Patent No.: US 9,009,705 B2
(45) Date of Patent: Apr. 14, 2015

(54) AUTHENTICATED DISTRIBUTION OF VIRTUAL MACHINE IMAGES

(71) Applicant: International Business Machines Corporation, Armonk, NY (US)

(72) Inventors: Ashish Kundu, Elmsford, NY (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 13/632,851

(22) Filed: Oct. 1, 2012

(65) Prior Publication Data

US 2014/0096133 A1  Apr. 3, 2014

(51) Int. Cl.

| | | |
|---|---|---|
| *G06F 9/455* | (2006.01) | |
| *G06F 17/00* | (2006.01) | |
| *G06F 7/04* | (2006.01) | |
| *G06F 9/445* | (2006.01) | |
| *G06F 21/00* | (2013.01) | |
| *G06F 9/50* | (2006.01) | |
| *G06F 21/57* | (2013.01) | |

(52) U.S. Cl.
CPC *G06F 9/455* (2013.01); *G06F 8/63* (2013.01); *G06F 21/00* (2013.01); *G06F 9/5072* (2013.01); *G06F 21/57* (2013.01); *G06F 9/45533* (2013.01); *G06F 2009/4557* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 7,496,757 B2 * | 2/2009 | Abbott et al. | 713/176 |
| 7,565,535 B2 | 7/2009 | Roberts et al. | |
| 8,073,926 B2 * | 12/2011 | Traut et al. | 709/203 |
| 8,601,583 B1 | 12/2013 | Chandrasekhar et al. | |
| 8,656,482 B1 | 2/2014 | Tosa et al. | |
| 2006/0253706 A1 | 11/2006 | Roberts et al. | |
| 2007/0071238 A1 * | 3/2007 | Adams et al. | 380/46 |
| 2008/0047015 A1 * | 2/2008 | Cornwall et al. | 726/25 |
| 2008/0134176 A1 * | 6/2008 | Fitzgerald et al. | 718/1 |
| 2008/0163208 A1 * | 7/2008 | Burr et al. | 718/1 |
| 2008/0184225 A1 * | 7/2008 | Fitzgerald et al. | 718/1 |
| 2008/0256639 A1 * | 10/2008 | Onoda et al. | 726/26 |
| 2010/0005306 A1 * | 1/2010 | Izu et al. | 713/176 |
| 2010/0107160 A1 * | 4/2010 | Srinivasan | 718/1 |
| 2010/0153749 A1 * | 6/2010 | Sakai | 713/193 |
| 2011/0126197 A1 | 5/2011 | Larsen et al. | |
| 2011/0219372 A1 * | 9/2011 | Agrawal et al. | 718/1 |
| 2011/0246778 A1 | 10/2011 | Duane | |
| 2011/0271270 A1 | 11/2011 | Bowen | |

(Continued)

OTHER PUBLICATIONS

U.S. Appl. No. 13/651,266, filed Oct. 12, 2012, 49 pages.

(Continued)

*Primary Examiner* — Adam Lee
(74) *Attorney, Agent, or Firm* — Yee & Associates, P.C.; Louis J. Percello

(57) ABSTRACT

A computer implemented method, a computer program product, and a computer distribute a virtual machine image. A request for a virtual machine image is received. Responsive to receiving the request or the virtual machine image, the authenticity of a virtual machine image catalog associated with the virtual machine image is identified. Responsive to identifying that the virtual machine image catalog is authentic, a first digital signature to be sent with the virtual machine image is determined. Responsive to determining the signature, the virtual machine image and the signature is sent.

20 Claims, 10 Drawing Sheets

(56) References Cited

U.S. PATENT DOCUMENTS

| | | |
|---|---|---|
| 2011/0296488 A1 | 12/2011 | Dandekar et al. |
| 2012/0030672 A1 | 2/2012 | Zygmuntowicz et al. |
| 2012/0167087 A1* | 6/2012 | Lee et al. ................ 718/1 |
| 2012/0179917 A1* | 7/2012 | Yach et al. ............... 713/189 |
| 2012/0216045 A1* | 8/2012 | Seguin et al. ............. 713/182 |
| 2012/0221744 A1* | 8/2012 | Heywood et al. ......... 709/247 |
| 2012/0266167 A1* | 10/2012 | Spiers et al. .............. 718/1 |
| 2012/0304169 A1* | 11/2012 | Anderson et al. ......... 718/1 |
| 2012/0324236 A1* | 12/2012 | Srivastava et al. ........ 713/189 |
| 2012/0324446 A1* | 12/2012 | Fries et al. ............... 718/1 |
| 2012/0331465 A1* | 12/2012 | Tanikawa ................. 718/1 |
| 2013/0212709 A1* | 8/2013 | Tucker .................... 726/29 |
| 2014/0013322 A1* | 1/2014 | Freimuth et al. .......... 718/1 |
| 2014/0013325 A1* | 1/2014 | Shimoni et al. ........... 718/1 |
| 2014/0041053 A1* | 2/2014 | Edwards et al. .......... 726/28 |
| 2014/0059541 A1* | 2/2014 | Heninger et al. .......... 718/1 |
| 2014/0096135 A1* | 4/2014 | Kundu et al. ............. 718/1 |

OTHER PUBLICATIONS

Mell et al., "The NIST Definition of Cloud Computing," dated Oct. 7, 2009, 2 pages. Accessed Jan. 27, 2014, http://www.nist.gov/itl/cloud/upload/cloud-def-v15.pdf.

Office action dated Jan. 2, 2015, regarding U.S. Appl. No. 13/651,266, 30 pages.

* cited by examiner

AUTHENTICATED DISTRIBUTION OF VIRTUAL MACHINE IMAGES

BACKGROUND

1. Field

The disclosure relates generally to the verification of authenticity (integrity ad origin) of the content. More specifically, the disclosure relates to a computer implemented method, a computer program product, and a data processing system for verifying virtual machine images.

2. Description of the Related Art

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

SUMMARY

According to one embodiment of the present invention, a computer implemented method and computer program product are provided for distributing and retrieving of authenticated Virtual machine images. A request for a virtual machine image is received. Responsive to receiving the request or the virtual machine image, the authenticity of a virtual machine image catalog associated with the virtual machine image is identified. Responsive to identifying that the virtual machine image catalog is authentic, a first digital signature to be sent with the virtual machine image is determined Responsive to determining the signature, the virtual machine image and the signature is sent.

DETAILED DESCRIPTION

Figure 1:
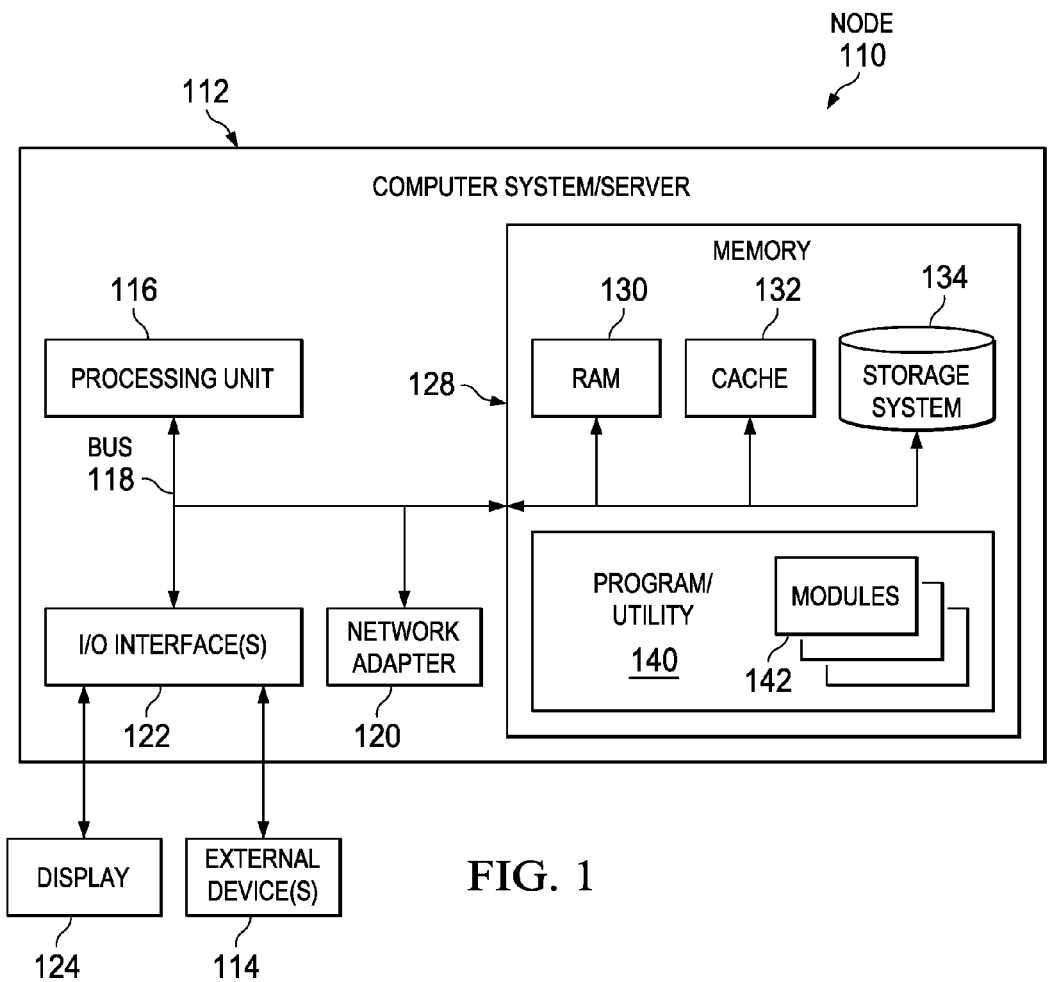
FIG. 1 is a schematic of an example of a cloud computing node shown according to an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.\

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is depicted in accordance with an illustrative embodiment. Cloud computing node 110 is only one example of a suitable cloud computing node and is not intended to suggest any limitation as to the scope of use or functionality of the illustrative embodiments described herein. Regardless, cloud computing node 110 is capable of being implemented and/or performing any of the functionality set forth hereinabove.

Cloud computing node 110 comprises computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 112 may be described in the general context of computer system executable instructions, such as program modules being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general purpose computing device. The components of computer system/server 112 may include, but are not limited to, one or more processors or processor unit 116, system memory 128, and bus 118 that couples various system components including system memory 128 to processor unit 116.

Processor unit 116 executes instructions for software that may be loaded into system memory 128. Processor unit 116 may be a number of processors, a multi-processor core, or some other type of processor, depending on the particular implementation. A number, as used herein with reference to an item, means one or more items. Further, processor unit 116 may be implemented using a number of heterogeneous processor systems in which a main processor is present with secondary processors on a single chip. As another illustrative example, processor unit 116 may be a symmetric multi-processor system containing multiple processors of the same type.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112 and it includes volatile media, non-volatile media, removable media, and non-removable media.

System memory 128 can include computer system readable media in the form of volatile memory, such as random access memory (RAM) 130 and/or cache memory 132. Computer system/server 112 may further include other removable/non-removable and volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM, or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the illustrative embodiments.

Program/utility 140, having a set (at least one) of program modules 142, may be stored in memory 128 by way of example and not limitation, as well as an operating system, one or more application programs, other program modules, and program data. Each of the operating systems, one or more application programs, other program modules, and program data or some combination thereof may include an implementation of a networking environment. Program modules 142 generally carry out the functions and/or methodologies of the illustrative embodiments as described herein.

Computer system/server 112 may also communicate with one or more external devices 114, such as a keyboard, a pointing device, display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks, such as a local area network (LAN), a general wide area network (WAN), and/or a public network (e.g., the Internet) via network adapter 120. As depicted, network adapter 120 communicates with the other components of computer system/server 112 via bus 118. It should be understood that, although not shown, other hardware and/or software components could be used in conjunction with computer system/server 112. Examples include, but are not limited to, microcode, device drivers, redundant processing units, external disk drive arrays, RAID systems, tape drives, and data archival storage systems, etc.

Figure 2:
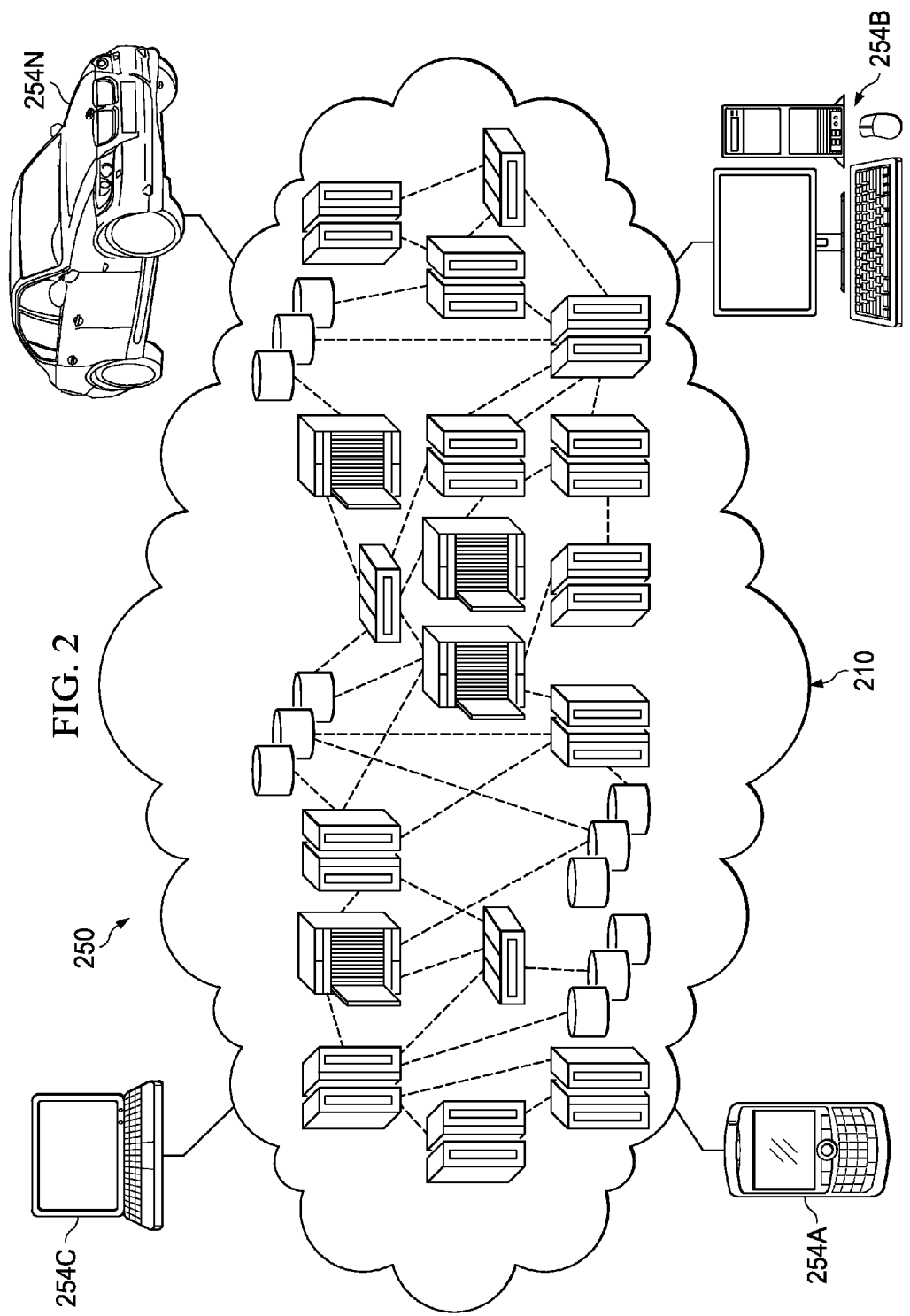
FIG. 2 is illustrative cloud computing environment shown according to an illustrative embodiment.

Referring now to FIG. 2, an illustration of a cloud computing environment is depicted in accordance with an illustrative embodiment. In this illustrative example, cloud computing environment 250 comprises one or more cloud computing nodes 210 with which local computing devices used by cloud consumers may communicate. For example, cloud computing node 110 in FIG. 1 is one example of cloud computing nodes 210. Local computing devices which may communicate with cloud computing nodes 210 may include, for example, personal digital assistant (PDA) or cellular telephone 254A, desktop computer 254B, laptop computer 254C, and/or automobile computer system 254N. Cloud computing nodes 210 may communicate with one another. They may be grouped (not shown) physically or virtually, in one or more networks, such as private, community, public, or hybrid clouds as described hereinabove or a combination thereof. This allows cloud computing environment 250 to offer infrastructure, platforms, and/or software as services for which a cloud consumer does not need to maintain resources on a local computing device. It is understood that the types of computing devices 254A, 254B, 254C, and 254N shown in FIG. 2 are intended to be illustrative only and that cloud computing nodes 210 and cloud computing environment 250 can communicate with any type of computerized device over any type of network and/or network addressable connection (e.g., using a web browser). Program code located on one of cloud computing nodes 210 may be stored on a computer recordable storage medium in one of cloud computing nodes 210 and downloaded to a computing device within computing devices 254A, 254B, 254C, and 254N over a network for use in these computing devices. For example, a server computer in cloud computing nodes 210 may store program code on a computer readable storage medium on the server computer. The server computer may download the program code to a client computer in computing devices 254A, 254B, 254C, and 254N for use on the client computer.

Figure 3:
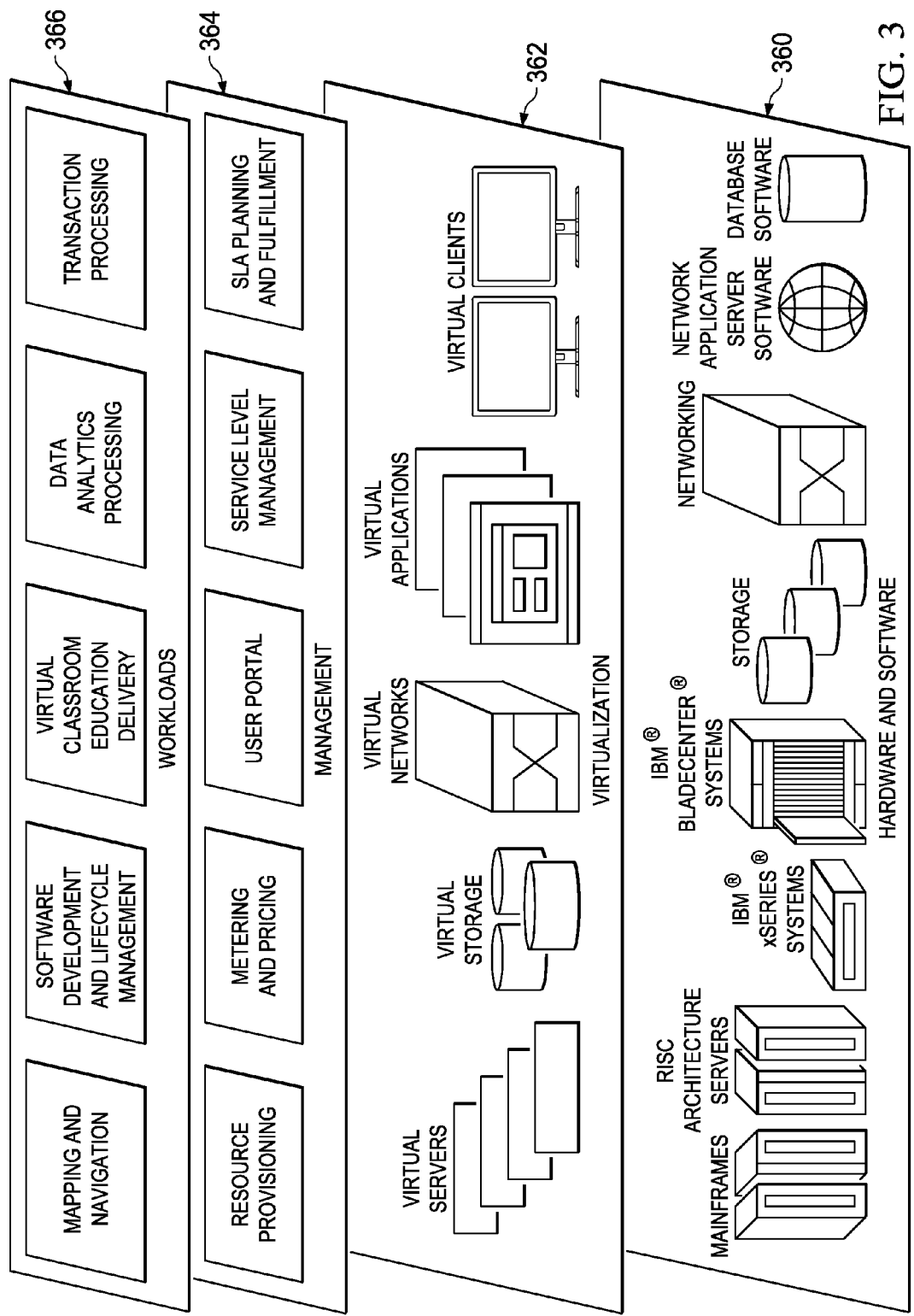
FIG. 3 is set of functional abstraction layers provided by cloud computing environment shown according to an illustrative embodiment.

Referring now to FIG. 3, a set of functional abstraction layers is depicted in accordance with an illustrative embodiment. The set of functional abstraction layers may be provided by cloud computing environment 250 in FIG. 2. It should be understood in advance that the components, layers, and functions shown in FIG. 3 are intended to be illustrative only and illustrative embodiments are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; and networks and networking components. Examples of software components include network application server software, in one example IBM® WebSphere® application server software; and database software, in one example IBM® DB2® database software. (IBM®, zSeries®, pSeries®, xSeries®, BladeCenter®, WebSphere®, and DB2® are trademarks of International Business Machines Corporation registered in many jurisdictions worldwide.)

Virtualization layer 362 provides an abstraction layer from which the following examples of virtual entities may be provided: virtual servers; virtual storage; virtual networks including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide usage and cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload monitoring, management, and security processing.

Virtual Machine Images (VMIs) are generally large files, ranging in size up to hundreds of gigabytes. Virtual machine images usually exist within the realm of data centers. Host machines, or physical servers, providing cloud infrastructure, such as in cloud computing node 110 of FIG. 1, usually access virtual machine imagers through a file system mounted on a local or remote disk, accessed through a network protocol, such as fiber channel, iSCSI, or NFS.

Virtual Machine Images have already started to appear across the whole internet. Some of them are paid and some of them are for a fee. These virtual machine images can, for example, be found in data centers, at local points of presence, at the edges of wired and wireless networks, and even within end user devices, such as desktops, laptops and smartphones. However, due to the large size of the virtual machine images, scaling the distribution to those host machines has become more important.

Virtual Machine based image provisioning techniques form the foundation for Infrastructure as a Service model. Typically, virtual machine images are served from a central image repository to each of the hypervisor nodes in the resource pool To improve latency and performance of Infrastructure as a Service model, techniques are being developed to deliver images or portions of images to requesting nodes using replicated/cached copies available at nodes in the vicinity of the target.

The replicated/cached copy approach opens up an opportunity to foster an ecosystem wherein images owned by different service providers could be used to compose images requested during provisioning. However, this approach to virtual machine image distribution also introduces security concerns regarding the authenticity and content of the various images and portions of images. Authentication of a VM image refers to verification of the origin of the VM image and the integrity of the VM image. If the origin is an unauthorized entity and/or the VM image has been tampered with un an unauthorized manner, the VM image is said to "in-authentic".

In general, current cloud computing platforms do not offer any mechanism for verification of authenticity of virtual machine images. Virtual machine images can be submitted by malicious users who may submit a corrupted image with malware embedded in it. That is why it is essential to verify the origin of the images. Virtual machine images maybe modified/tampered/corrupted on the network from the creator/submitter to the image repository or from the repository to the caching/replication nodes, from the repository/caching/replication to the hypervisor node where it would be instantiated, or on any network path. The VM images may also be modified/tampered/corrupted in the repository (images catalog), at the distribution nodes that cache/replicate the images or at the hypervisor itself at the time of instantiation/distribution.

The illustrative embodiment described herein addresses security and authentication issues of image content located at different hypervisor nodes, and the mechanisms to validate content before used for provisioning of virtual machines.

The illustrative embodiment described herein enables authenticated distribution of complete virtual images, and parts of virtual images. A virtual machine image creator computes signatures of images with or without the signatures of authenticated components. The computed signature enables signing images based on the semantics, structure, representation, distribution and provisioning schemes. A catalog server computes and stores signatures for part(s) of images to be distributed.

In order to ensure authentication, verification of authenticity can be performed both before and after streaming large images/part(s). Thus, due to the enablement of signing catalog entries clients can verify authenticity of catalog results. A client can verify authenticity of results containing catalog entries. An entity who plans to submit a VM image to the catalog may also verify the integrity of the catalog before submitting the image (in order to check whether the image would be trusted by clients of VM images).

Virtual Machine Image provisioning is an important operation in the context of cloud enablement. The amount of time and network bandwidth it requires in order to instantiate a virtual machine image in a given setup and data center location depends on the scheme used to distribute the virtual machine images. There are two such schemes: flat file-based schemes, and chunk-based schemes, in which chunks of a virtual machine image maybe received from several peers or systems in order minimize network and distribution cost and latency.

When virtual machine images are shared between peers, it is important to verify that the image has not been modified in an unauthorized manner and is originated from an authorized source. The threat of an image that originates from an unauthorized/malicious entity, or of an image that has been modified in an unauthorized manner—with code injection, or bugs that have been introduced—should be minimized.

One such manner of image verification is through a digital signature utilizing a computation of hashes. In one such embodiment, a hash of a virtual machine image being distributed in chunks is created using a Merkle hash technique.

Signer—who can sign: the creator, an authorized owner, an entity with the signature authority to sign the specific VM image(s)

Verifier—who can verify the authenticity of a VM image: anyone who has access to the VM image or part of the VM image is a client and can act as a verifier. A client may choose to verify the signature of part of an image or the whole image.

Redaction: redaction is the process of removing certain parts from a VM image. A redactor is the one who carries out the process of redaction. A redactable signature is the one that allows signing a complete image, redacting certain parts of the image and computing the signature of the redacted image, and verifying the authenticity of the redacted image.

Computation of signatures: Digital signature of a VM image is computed by signing the Merkle hash or using an aggregate signature such as the Condensed-RSA or Elliptic Curve based aggregate signatures or redactable signatures or sanitizable signatures.

Verification of authenticity: Authenticity is verified by validating the signature of the VM image.

A virtual machine image can be represented as a flat file, as a list of chunks, as a tree or as a graph. The chunks maybe of uniform sizes or of different sizes. In an illustrative embodiment, a flat file-based virtual machine is either distributed as a whole or not at all distributed to a client. In a flat file-based virtual machine image, an illustrative embodiment computes a hash in a manner similar to computing the hash of a string. In an illustrative embodiment, for a virtual machine that is distributed in chunks, an illustrative embodiment creates a Merkle hash tree with each chunk as a leaf. In another illustrative embodiment, a VM image content is represented as a tree, which is then used to compute the Merkle hash. In another illustrative embodiment, a VM image context is represented as a graph with nodes and edges (a node represents a chunk, and an edge represents a dependency between two chunks referred to by the nodes).

For purposes of establishing integrity of the virtual machine image, if it is not essential to authenticate the origin of the VM image, then integrity of the received image can be carried out by computing the hash of the received image. The hash of the received image is then matched to a published hash of the image. Computing the hash of an image can be carried out either considering the image as a string or as a tree or as a graph. Hash of a tree can be computed using Merkle hash technique (as described above). Hash of a tree or a graph can also be computed by using the schemes proposed by Kundu and Bertino.

For purposes of establishing authenticity of the virtual machine image, it is essential to authenticate the origin of the virtual machine image as well as verify the integrity of the received virtual machine image. In such a scenario, the digital signature of the VM image is computed. The digital signature is then used to verify authenticity of the image.

Hat file-based virtual machine images are either distributed as a whole or not at all distributed to a client: Compute the signature of the virtual machine image, by signing the VM image using redactable signature algorithm or some other signature scheme. Verification of the signature is carried out as per the signature protocol.

In one illustrative embodiment, for chunk-based virtual machine image distribution, verification of the signature is carried out though a signature and verification of a Merkle hash. A Merkle hash of the virtual machine image is signed. That signature is later verified in order to validate authenticity of the virtual machine image.

In one illustrative embodiment, for chunk-based virtual machine image distribution, verification of the signature uses an aggregate signature scheme such as Condensed RSA scheme or a Redactable signature scheme or Elliptic curve based scheme.

Condensed signature: The aggregate signature scheme computes the aggregate signature of the image. Groups of chunks of the VM images are signed and the signatures are aggregated. This process is carried out by the condensed signature schemes (such as condensed RSA signature schemes). A provisioning service receiving the chunks of a virtual machine image also receives the aggregate signature for the virtual machine image. The provisioning service follows the aggregate signature protocol in order to verify the authenticity of the chunks of the virtual machine image. If a client wants to or can only verify the authenticity of some but not all chunks, then the client receives cryptographic details for the verification.

Thus, illustrative embodiments of the present invention provide a computer implemented method and computer program product for distributing a virtual machine image. A request for a virtual machine image is received. Responsive to receiving the request or the virtual machine image, the authenticity of a virtual machine image catalog associated with the virtual machine image is identified. Responsive to identifying that the virtual machine image catalog is authentic, a first digital signature to be sent with the virtual machine image is determined. Responsive to determining the signature, the virtual machine image and the signature is sent.

Figure 4:
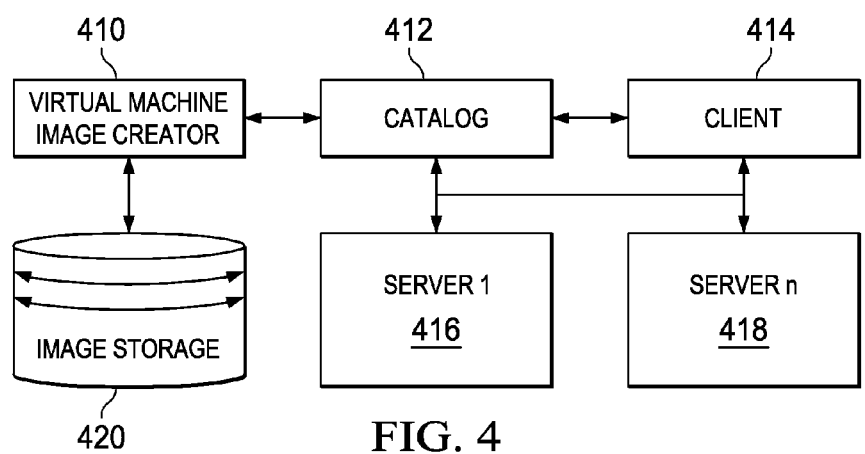
FIG. 4 is a virtual machine image verification system is shown according to an illustrative embodiment.

Referring now to FIG. 4, a virtual machine image verification system is shown according to an illustrative embodiment. Virtual machine image verification system 400 can execute within a management layer of a cloud computing environment, such as management layer 364 of FIG. 3.

Virtual machine image creator 410 is a software component that allows for customization of a virtual machine image, and the installation thereof. Customization of the virtual machine image can be, for example, made by adding components to and removing components from the virtual machine image. These components can comprise, for example but not limited to, a base image of the virtual machine, drivers used by the virtual machine and other components for use by the virtual machine.

Catalog 412 is a data store containing descriptions of the various virtual machine images available for distribution. Set of catalog entries 413 are those descriptions of the various virtual machine images available for distribution that can reference virtual machine images stored in an external storage, for example, in image storage 420. The descriptions can be descriptions of the properties and capabilities of the virtual machine image. The description can describe the properties and capabilities, for example, in terms of hardware configuration and software configuration for the associated virtual machine image. Catalog 412 can be queried for candidate virtual machine images by specifying requirements that should be met by the candidate virtual machine images.

Client 414 is a local computing device that consumes cloud based services. Client 414 can be, for example, personal digital assistant (PDA) or cellular telephone 254A, desktop computer 254B, laptop computer 254C, and/or automobile computer system 254N of FIG. 2.

Server 1 416 and server n 418 are computing nodes on which a virtual machine running a virtual machine image is executed. Server 1 416 and server n 418 can be, for example, cloud computing environment 50 of FIG. 2.

Image store 420 is a data storage containing virtual machine images. Image store 420 can be, for example, storage system 134 of FIG. 1.

Figure 5:
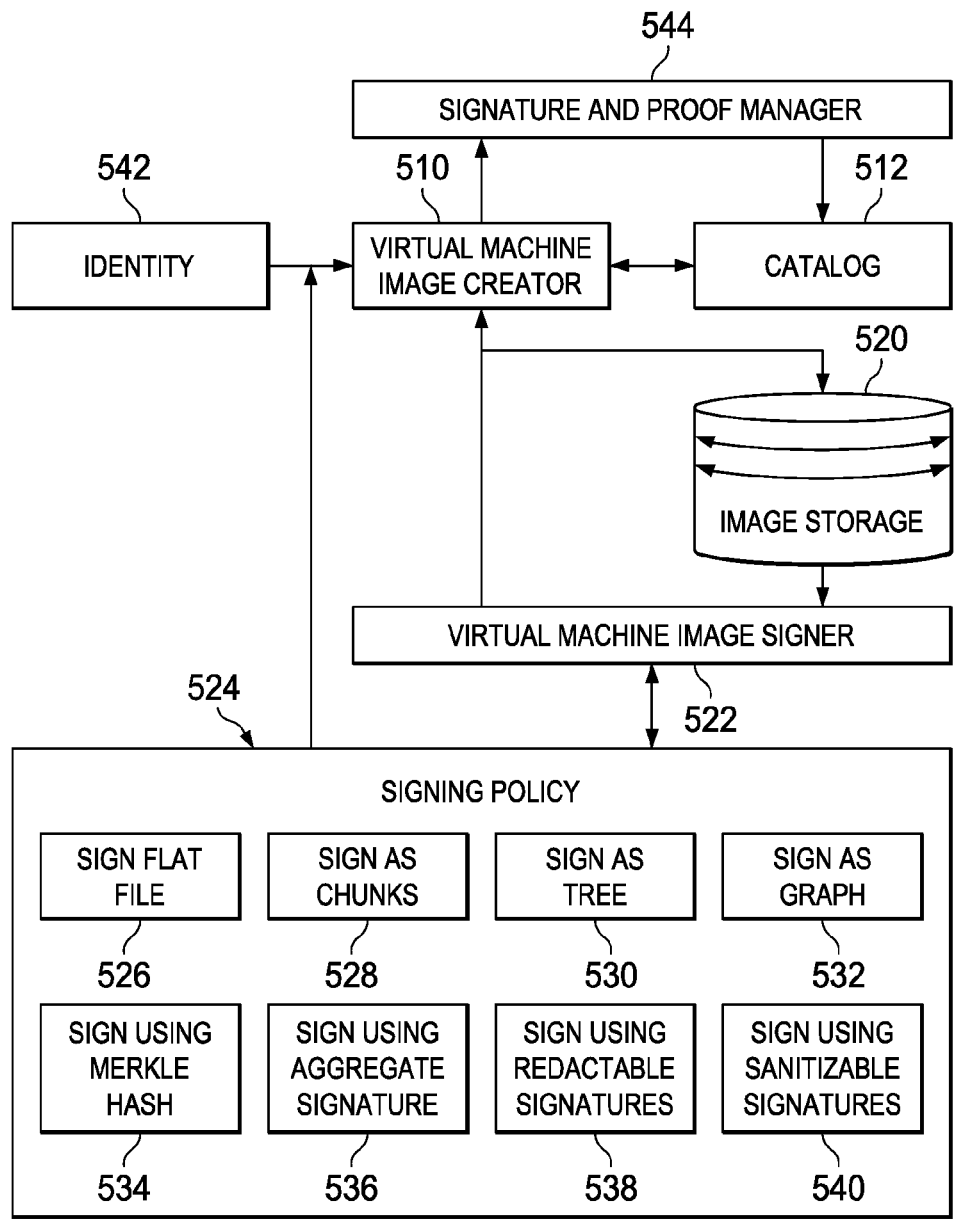
FIG. 5 is a virtual machine image verification system showing a plurality signing policies is shown according to an illustrative embodiment.

Referring now to FIG. 5, a virtual machine image verification system showing a plurality signing policies is shown according to an illustrative embodiment. Virtual machine image verification system 500 is virtual machine image verification system 400 of FIG. 4.

Virtual machine image creator 510 is virtual machine image creator 410 of FIG. 4. Catalog 512 is Catalog 412 of FIG. 4. Image store 520 is Image store 420 of FIG. 4.

Virtual machine image signer 522 is a software component for providing digital signatures of virtual machine images and parts of virtual machine images. Virtual machine image signer 522 can utilize any scheme for demonstrating the authenticity of a virtual machine images and parts of virtual machine images. Virtual machine image signer 522 provides and verifying digital signatures of virtual machine images and parts of virtual machine images according to signing policy 524.

Signing policy 524 is one or more rules used to decide a specific signing scheme. Signing policy 524 includes one or more policies, such as sign flat line 526, sign as chunks 528, sign as tree 530, sign as graph 532, sign using hash scheme 534, sign using aggregate signature 536, sign using redactable signature 538, and sign using sanitizable signature 540.

Sign flat file 526 is a signing policy that applies a digital signature by virtual machine image signer 522 to a flat file. The flat file is a data file, such as a stand-alone list, that does not contain any linkages to another file.

Sign as chunks 528 is a signing policy that applies a digital signature by virtual machine image signer 522 to chunks of the virtual machine image. Virtual machine images can be stored within image storage 520 as chunks. Each chunk is a "chunk" of data, or byte pattern, the combination of which sums to the virtual machine image.

A chunking algorithm typically provides a procedure for dividing a virtual machine image into chunks. There are multiple options for the chunking algorithm. In one illustrative embodiment, the chunking algorithm uses the VMI's operating system (OS) pages as chunks. In another illustrative embodiment, the chunking algorithm uses VMI's OS files as chunks. In another illustrative embodiment, the chunking algorithm creates chunks based on the VMI's byte-sequences. For example, a byte-sequence having a certain property can be used by the chunking algorithm to mark the beginning of a new chunk.

"Sign as tree" 530 is a signing policy that applies a digital signature by virtual machine image signer 522 to sign a data structure which containing a tree of summary information about the virtual machine image. A hash tree signed by "sign as tree" 530 can be a combination of hash lists and hash chaining.

"Sign as graph" 532 is a signing policy that applies a digital signature by virtual machine image signer 522 to "sign a graph" containing a summary information about the virtual machine image.

Sign using hash scheme 534 is a signing policy that directs the use of a certain hash function for hashing a virtual machine image, or the chunked parts of a virtual machine image. For example, in one illustrative embodiment, hash function 534 could specify that a Merkle hash tree is to be used to create the hash function. Sign using hash function 534 could specify that a signature is computed from the hash computed as above.

Sign using aggregate signature 536 is a signing policy that applies an aggregate digital signature to a virtual machine image, or the chunked parts of a virtual machine image. An Aggregate Signature Scheme combines several signatures associated with the different chunks of the document and produces a single signature for the complete document. The size of the aggregated signature is substantially smaller than sum of the sizes of the several signatures.

Sign using redactable signature 538 is a signing policy that applies a redactable digital signature scheme to a virtual machine image represented as a set of chunks, a tree or a graph. A redactable digital signature permits digitally signed documents to be authenticated while also redacting certain information even after the document has been signed. After redaction, the signature scheme is used to compute the signature of the redacted document from the signature of the original document and certain other information. Thus documents can be authenticated even after some of the content has been modified/redacted, but also permits detection if the content (in the document redacted or as it is) has been altered.

Sign using sanitizable signature 540 is a signing policy that applies a sanitizable digital signature scheme to a virtual machine image, represented as a set of chunks, a tree or a graph. A sanitizable signature allows designated portions of the document to be modified/sanitized by a semi-trusted censor. The sanitizable signature still produces a valid signature on the document modified/sanitized by the censor. Designated portions of the document are explicitly indicated as modifiable under prior agreement between the signer and the censor. If any other portion of the document is modified, a valid signature cannot be produced.

Identity 542 is an identification of an entity signing the virtual machine image, or the chunked parts of a virtual machine image.

Signature and proof manager 544 is a software component that allows for storage and retrieval of signatures and signature meta-data for virtual machine image, or the chunked parts of a virtual machine image. Based on type of image representation or distribution, signature and proof manager 544 can compute redacted or sanitized signature of parts of an image represented as a list, tree or graph. Furthermore, based on type of image representation or distribution, Signature and proof manager 544 can distribute signatures to a client, such as client 414 of FIG. 4, or a verifier, such as verifier 646 of FIG. 6.

Figure 6:
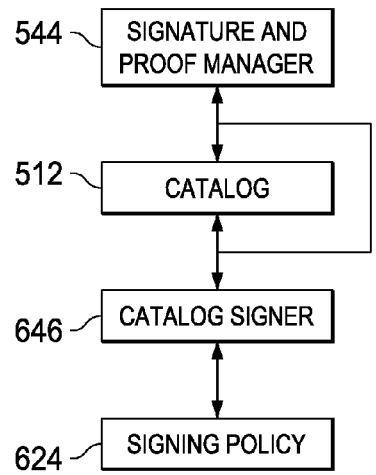
FIG. 6 is virtual machine image verification system showing a catalog signer is shown according to an illustrative embodiment.

Referring now to FIG. 6 a virtual machine image verification system showing a catalog signer is shown according to an illustrative embodiment. Virtual machine image verification system 600 is an extension of virtual machine image verification system 500 of FIG. 5.

Catalog 612 is catalog 512 of FIG. 5. Catalog signer 626 is catalog signer 526 of FIG. 6. Signature and proof manager 644 is signature and proof manager 544 of FIG. 5.

Catalog signer 646 is a software component for providing and verifying digital signatures of catalog 612. Catalog signer 646 digitally signing a catalog entry 613 within catalog 612. Catalog signer 646 can utilize any scheme for demonstrating the authenticity of catalog files within catalog 612. The digital signature created by catalog signer 645 is saved within the associated catalog file. The digital signature within the catalog file is maintained as long as the components hash to the same value. The digital signature is invalidated if any components of the catalog entry 613 are modified in an unauthorized manner Any authorized modification of catalog entries is followed by computation of the signature of the updated catalog.

Figure 7:
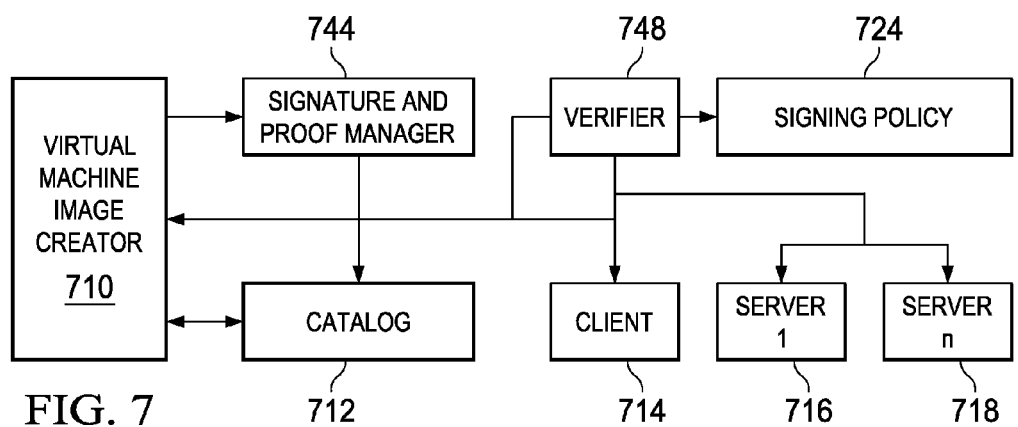
FIG. 7 is a virtual machine image verification system showing a digital signature verifier is shown according to an illustrative embodiment FIGS. 8A and 8B collectively are a process for maintaining a catalog of virtual machine images according to an illustrative embodiment.

Referring now to FIG. 7, a virtual machine image verification system showing a digital signature verifier is shown according to an illustrative embodiment. Virtual machine image verification system 700 is an extension of virtual machine image verification system 600 of FIG. 6.

Verifier 748 is a software component for verifying digital signatures of virtual machine images and parts of virtual machine images. Verifier 748 can utilize the scheme that has been used for signing the VM image for verifying its and/or its. Verifier 748 verifies digital signatures of virtual machine images and parts of virtual machine images according to signing policy 724. The signing policy when applied returns the signing scheme used to sign the VM image. Verifier 748 also 748 verifies digital signatures of catalog 712 and set of catalog entries 713. Verifier 748 uses a verification policy. A verification policy is a set of rules that dictate how and when to verify. For example, some of the rules include: verify the parts of the images as and when they are received; verify only the complete image if the client/hypervisor/verification requestor requests similarly; only verify the complete image by default.

Figure 8A:
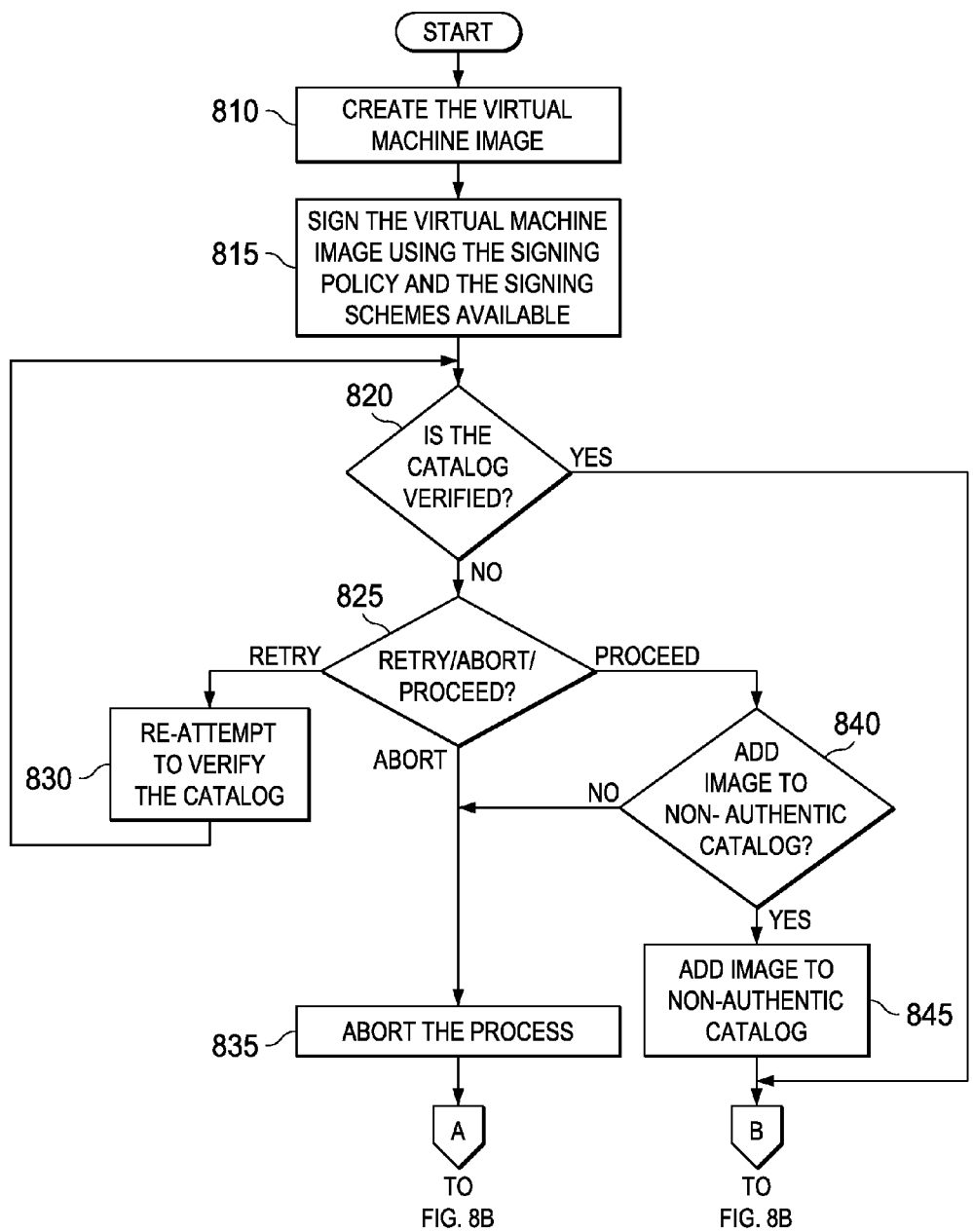
Figure 8B:
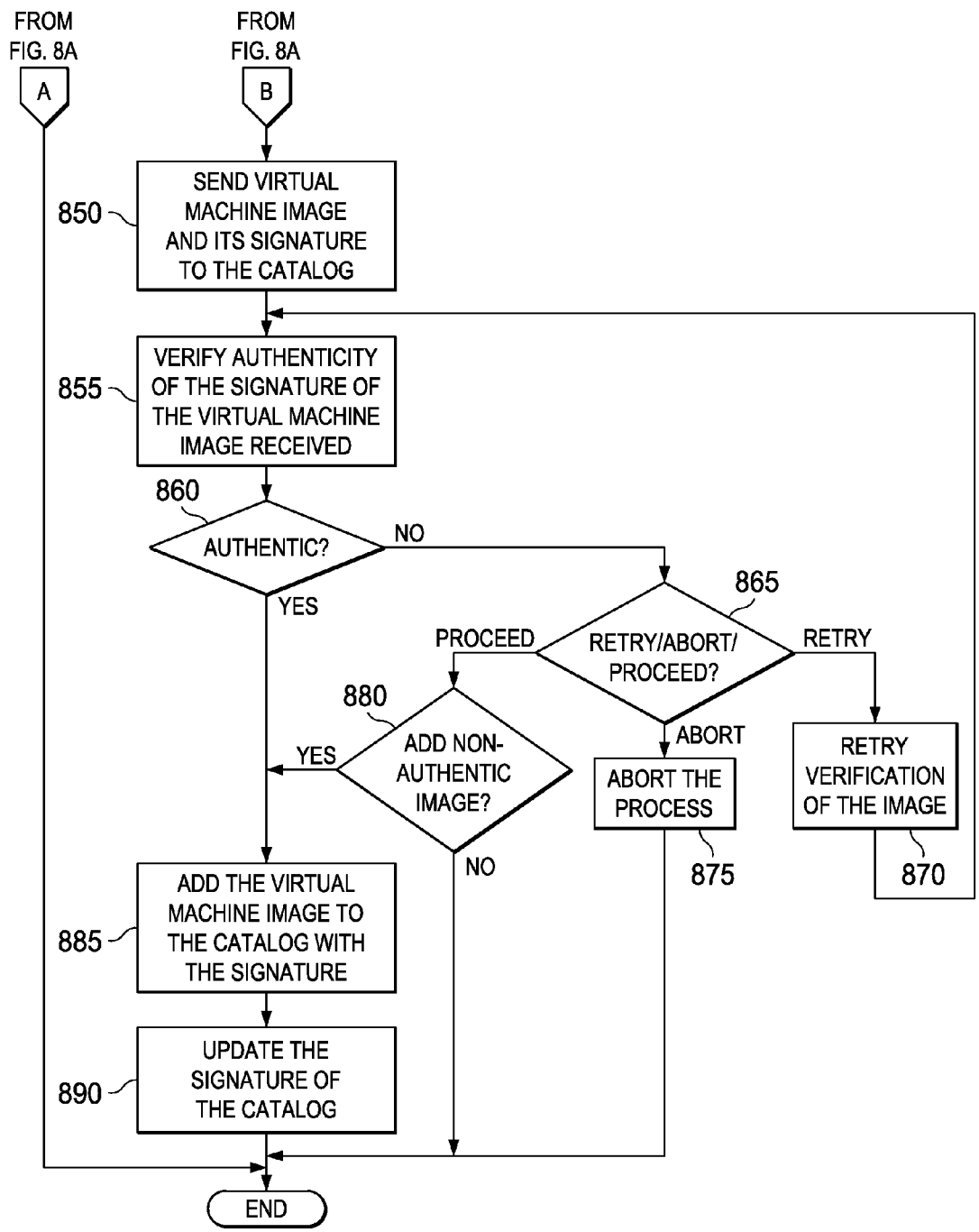

Referring now to FIG. 8, a process for maintaining a catalog of virtual machine images is shown according to an illustrative embodiment. Process 800 is a software process executing on a virtual machine image verification, such as virtual machine image verification system 500 of FIG. 5.

Process 800 begins by creating a virtual machine image (step 810). The virtual machine image can be a virtual machine image created by a virtual machine image creator, such as virtual machine image creator 410 of FIG. 4. The virtual machine image can be a customized virtual machine image, made by adding components to and removing components from the virtual machine image. These components can comprise, for example but not limited to, a base image of the virtual machine, drivers used by the virtual machine and other components for use by the virtual machine.

Process 800 signs the virtual machine image using a signing policy and a signing scheme available (step 815). The signing policy can be, for example, signing policy 524 of FIG. 5. The signing policy is one or more rules used to decide a specific signing scheme. The signing policy can include one or more policies, such as sign flat line, sign as chunks, sign a tree, sign as graph, sign using hash scheme, sign using aggregate signature, sign using redactable signature, and sign using sanitizable signature. In one illustrative embodiment, for chunk-based virtual machine image distribution, the signature scheme is an aggregate signature scheme such as Condensed RSA scheme or a redactable signature scheme or Elliptic curve based scheme.

Process 800 then attempts to verify the catalog (step 820). This step is optional and can be requested by a client. The catalog entry can be verified, for example, by authenticating an electronic signature associated with the catalog entry. The electronic signature can be a digital signature of the catalog entry. The digital signature can be a digital signature created, for example, though a signing policy, such as signing policy 524 of FIG. 5. In one illustrative embodiment, step 820 is optional and can be requested by a client. The catalog entry can be verified by a verifier, such as verifier 646 of FIG. 6.

Responsive to not verifying the catalog ("no" at step 820), process 810 can retry the verification, abort the verification, or proceed (step 825). Responses to process 800 retrying the verification process ("retry" at step 825), process 800 re-attempts to verify the catalog (step 830). The catalog can be really verified, for example, by reacquiring the catalog or by resending the catalog to the verifier, such as verifier 646 of FIG. 6. Process 800 then iterates back to step 822 reattempts the verification process.

Returning now to step 825, responsive to process 800 aborting the verification process ("abort" at step 825), process 800 aborts the verification process (step 835). Process 800 terminates thereafter.

Returning now to step 825, responsive to process 800 proceeding with the verification process ("proceed" at step 825), process 800 determines whether to add the virtual machine to a non-authentic image catalog (step 840). The non-authentic image catalog is a catalog such as catalog 512 of FIG. 5. The non-authentic image catalog contains virtual machine images that are not authenticated.

Responsive to process 800 determining not to add the virtual machine to the non-authentic image catalog ("no" at step 840), process 800 aborts the verification process (step 835). Process 800 terminates thereafter.

Returning now to step 840, responsive to process 800 determining to add the virtual machine to the non-authentic image catalog ("yes" at step 840), process 800 adds the image to the non-authentic image catalog (step 845).

Process 800 sends the virtual machine image and its signature to the appropriate catalog (step 850). If the catalog was verified at step 820, the virtual machine image and its signature is sent to the catalog containing verify virtual machine images. However if the catalog was not verified at step 820, the virtual machine image and his signatures can be sent to the non-authentic image catalog.

Process 800 verifies the authenticity of the signature of the virtual machine image that is received (step 855). The authenticity of the signature of the virtual machine can be verified, for example, by a verifier such as verifier 646 of FIG. 6. The verifier is a software component for verifying digital signatures of virtual machine images and parts of virtual machine images. The verifier can utilize the scheme that has been used for signing the VM image for verifying its and/or its. The verifier verifies digital signatures of virtual machine images and parts of virtual machine images according to a signing policy. The signing policy when applied returns the signing scheme used to sign the VM image. The verifier verifies digital signatures of a catalog and a set of catalog entries. The verifier uses a verification policy. A verification policy is a set of rules that dictate how and when to verify. For example, some of the rules include: verify the parts of the images as and when they are received; verify only the complete image if the client/hypervisor/verification requestor requests similarly; only verify the complete image by default.

Responsive to determining that the signature of the virtual machine image is not authentic ("no" at step 860), process 800 can retry the verification, abort the verification, or proceed (step 865). Responses to process 800 retrying the verification process ("retry" at step 865), process 800 re-attempts to verify the signature of the virtual machine image (step 870). The catalog can be really verified, for example, by reacquiring the catalog or by resending the catalog to the verifier, such as verifier 646 of FIG. 6. Process 800 then iterates back to step 855 reattempts the virtual machine image verification process.

Returning now to step 865, responsive to process 800 aborting the virtual machine image verification process ("abort" at step 865), process 800 aborts the verification process (step 875). Process 800 terminates thereafter.

Returning now to step 865, responsive to process 800 proceeding with the verification process ("proceed" at step 865), process 800 determines whether to add the non-authentic virtual machine to a non-authentic image catalog (step 880). The non-authentic image catalog is a catalog such as catalog 512 of FIG. 5. The non-authentic image catalog contains virtual machine images that are not authenticated.

Responsive to process 800 determining not to add the non-authentic virtual machine image to the non-authentic image catalog ("no" at step 880), process 800 aborts the verification process (step 835). Process 800 terminates thereafter.

Returning now to step 840, responsive to process 800 determining to add the virtual machine to the non-authentic image catalog ("yes" at step 880), process 800 proceeds to step 885).

Process 800 adds the virtual machine image to the appropriate catalog (step 885). If the signature of the virtual machine image was verified as authentic at step 860, the virtual machine image and its signature are added to the catalog containing verified virtual machine images. However if the signature of the virtual machine image was not verified at step 860, the virtual machine image and his signatures can be added to the non-authentic image catalog.

Process 800 then updates the signature of the catalog (step 890) with the process terminating thereafter. Because an additional virtual machine image is added to the catalog, the prior signature of the catalog is no longer valid. Therefore a new signature must be hashed. The catalog signature is updated to reflect this new hash value.

Figure 9A:
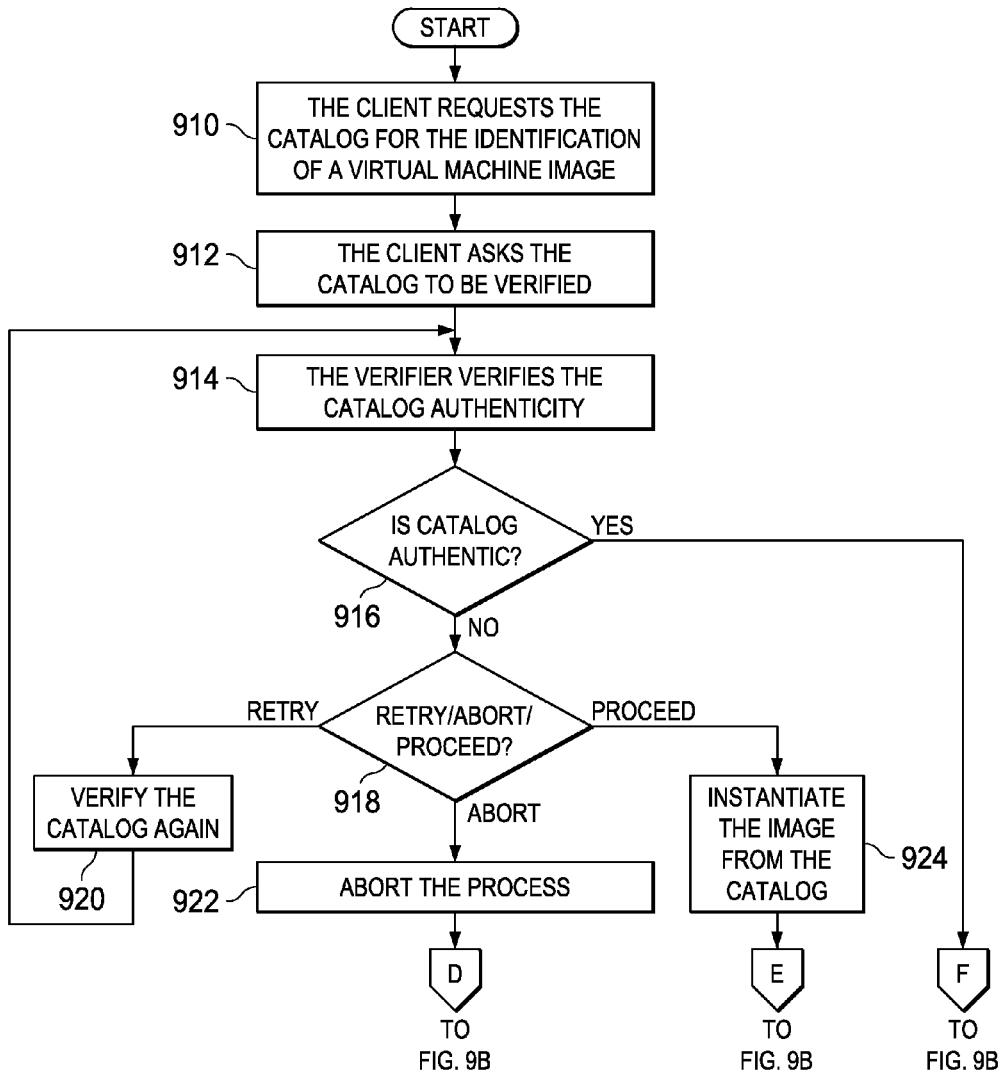
FIGS. 9A and 9B collectively are a process for retrieving a virtual machine image according to an illustrative embodiment.
Figure 9B:
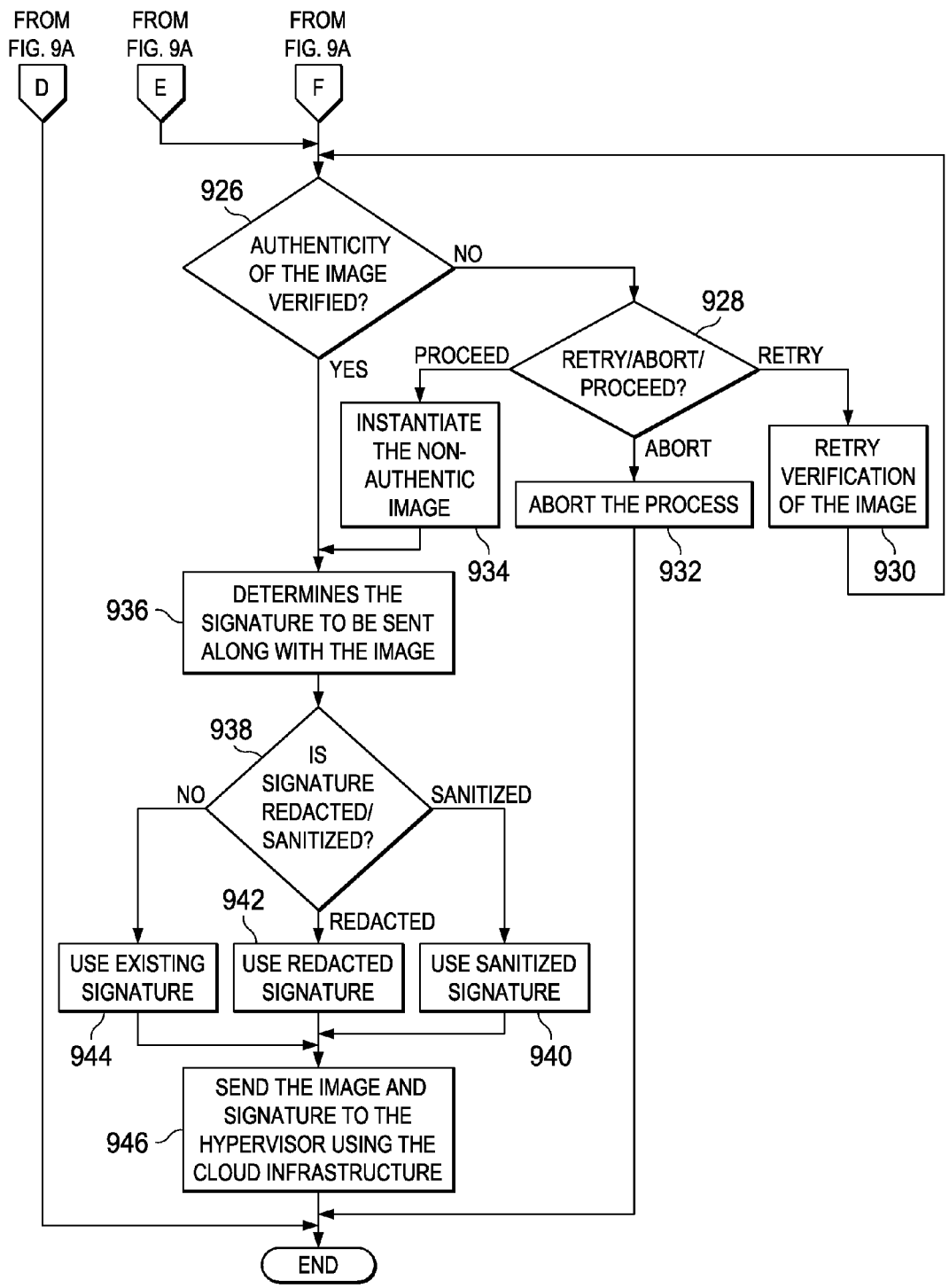

Referring now to FIG. 9, a process for retrieving a virtual machine image is shown according to an illustrative embodiment. Process 800 is a software process executing on a virtual machine image verification, such as virtual machine image verification system 500 of FIG. 5.

Process 900 begins when a client requests the catalog for the identification of a virtual machine image (step 910). The virtual machine image can be, for example, a request for a virtual machine image stored within an image storage, such as image storage 420 of FIG. 4. The request can be a request from a client, such as client 414 of FIG. 4, for provisioning of a virtual machine to execute on a server, such as server 1 416 or server n 418 of FIG. 4.

The client asks the catalog to be verified (step 912), and a verifier verifies the authenticity of the catalog (step 914). The catalog can be verified, for example, by authenticating an electronic signature associated with the catalog entry. The electronic signature can be a digital signature of the catalog entry. The digital signature can be a digital signature created, for example, though a signing policy, such as signing policy 524 of FIG. 5. In one illustrative embodiment, step 820 is optional and can be requested by a client. The catalog entry can be verified by a verifier, such as verifier 646 of FIG. 6.

Responsive to determining that the catalog is not authentic ("no" at step 916), process 916 can retry the verification, abort the verification, or proceed (step 918). Responsive to process 900 retrying the verification process ("retry" at step 918), process 900 re-attempts to verify the catalog (step 920). The catalog can be really verified, for example, by reacquiring the catalog or by resending the catalog to the verifier, such as verifier 646 of FIG. 6. Process 900 then iterates back to step 910 and reattempts the verification process.

Returning now to step 918, responsive to process 900 aborting the verification process ("abort" at step 918), process 900 aborts the verification process (step 922). Process 900 terminates thereafter.

Returning now to step 918, responsive to process 900 proceeding with the verification process ("proceed" at step 918), process 800 instantiates the non-authentic virtual machine image (step 924).

Returning now to step 916, responsive to determining that the catalog is authentic ("yes" at step 916), process 900 verifies the authenticity of the virtual machine image (step 926). The virtual machine image can be verified, for example, by authenticating an electronic signature associated with the virtual machine image. The electronic signature can be a digital signature of the virtual machine image. The digital signature can be a digital signature created, for example, though a signing policy, such as signing policy 524 of FIG. 5. In one illustrative embodiment, step 820 is optional and can be requested by a client. The virtual machine image can be verified by a verifier, such as verifier 646 of FIG. 6.

Responsive to determining that the virtual machine image is not authentic ("no" at step 926), process 900 can retry the verification, abort the verification, or proceed (step 928). Responsive to process 900 retrying the verification process ("retry" at step 928), process 900 re-attempts to verify the virtual machine image (step 930). The virtual machine image can be re-verified, for example, by reacquiring the virtual machine image or by resending the virtual machine image to the verifier, such as verifier 646 of FIG. 6. Process 900 then iterates back to step 926 and reattempts the verification process.

Returning now to step 928, responsive to process 900 aborting the verification process ("abort" at step 928), process 900 aborts the verification process (step 932). Process 900 terminates thereafter.

Returning now to step 928, responsive to process 900 proceeding with the verification process ("proceed" at step 928), process 800 instantiates the non-authentic virtual machine image (step 934). Process 900 then proceeds to step 936.

Returning now to step 926, responsive to determining that the virtual machine image is authentic ("yes" at step 926), process 900 determines the signature to be sent along with the image (step 936). In one illustrative embodiment, for chunk-based virtual machine image distribution, verification of the signature is chosen from an aggregate signature scheme such as Condensed RSA scheme or a Redactable signature scheme or Elliptic curve based scheme.

Process 900 then identifies whether the signature is a redactable signature, a sanitizable signature, or a similar signature (step 938). Responsive to identifying that a sanitizable signature should be used ("sanitizable" at step 938), process 900 uses a sanitizable signature (step 940). A sanitizable signature allows designated portions of the document to be modified/sanitized by a semi-trusted censor. The sanitizable signature still produces a valid signature on the document modified/sanitized by the censor. Designated portions of the document are explicitly indicated as modifiable under prior agreement between the signer and the censor. If any other portion of the document is modified, a valid signature cannot be produced.

Responsive to identifying that a redactable signature should be used ("redactable" at step 938), process 900 uses a redactable signature (step 942). A redactable signature is a digital signature that allows signing a complete image, redacting certain parts of the image and computing the signature of the redacted image. Authenticity of the redacted image is verified based on the authenticity of the redacted image.

Responsive to identifying that a similar signature should be used ("similar" at step 938), process 900 uses a similar signature (step 944). The Image Distribution Network is aware of data similarity between Virtual Machine imagers, and as such can reduce redundant downloads of the same data across different virtual machine images.

Process 900 sends the virtual machine image and signature to the hypervisor using the cloud infrastructure (step 946), process terminating thereafter. A hypervisor associated with the cloud infrastructure can then use the virtual machine image to provision virtual machines on the cloud infrastructure.

Figure 10:
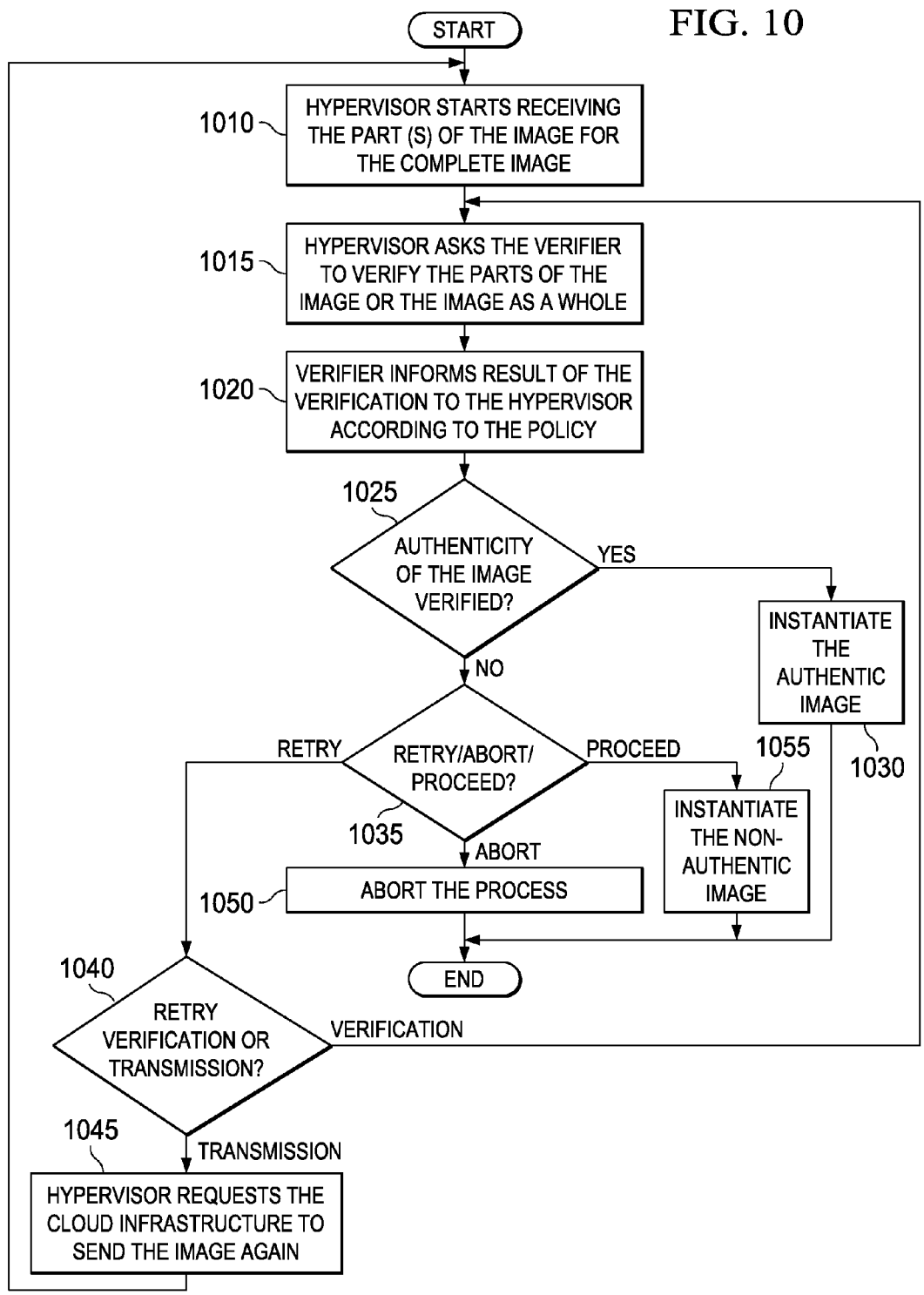
FIG. 10 is a process for receiving a virtual machine image according to an illustrative embodiment.

Referring now to FIG. 10, a process for receiving a virtual machine image is shown according to an illustrative embodiment. Process 1000 is a software process executing on a software component such as such as virtual machine image verification system 500 of FIG. 5.

Process 1000 begins when a hypervisor begins receiving a virtual machine image, or parts of a virtual machine image (step 1010). When a client selects to proceed with instantiation, the virtual machine image distribution system starts sending the virtual machine image or its chunks from respective servers to the hypervisor that would create an instance of the image. As part of this process the VM image distribution system may work with the hypervisor and the distribution servers in order to determine the best possible way and set of servers from which the image is distributed.

Responsive to receiving the virtual machine image or parts thereof, the hypervisor asks the verifier to verify parts of the virtual machine image, or the virtual machine image as a whole (step 1015). Along with the parts/image, it also receives certain signature information. The hypervisor asks a verifier, such as verifier 646 of FIG. 6, to verify the authenticity of the parts/complete image received thus far. The hypervisor repeats the verification requests as more parts/image is received. In another illustrative embodiment, the hypervisor may ask the verifier to verify the authenticity of the parts/image after it is ready to get them verified. The verifier maybe colocated with the hypervisor thus aiding to the access of the image by the verifier.

The verifier informs the result of the verification to the hypervisor according to the signing policy (step 1020). The signing policy can be, for example, signing policy 524 of FIG. 5. In one illustrative embodiment, the verifier returns 1 or 0 to each verification request. If all the verification requests sent thus far have resulted in 1 that is received by the hypervisor, then the hypervisor proceeds with instantiation of the image. Instantiation refers to the process of the image creation.

Process 1000 then determines whether the authenticity of the virtual machine image is verified (step 1025). Responsive to determining that the authenticity of the virtual machine image is verified ("yes" at step 1025), the hypervisor instantiates the virtual machine image (step 1030). Process 1000 terminates thereafter.

Returning now to step 1025, responsive to determining that the authenticity of the virtual machine image is not verified ("no" at step 1025),), process 1000 can retry the verification, abort the verification, or proceed (step 1035). Responsive to process 1000 retrying the verification process ("retry" at step 1035), the hypervisor requests the cloud infrastructure to resend the virtual machine image (step 1045). Process 1000 and iterates back to step 1010 to receive the virtual machine image or parts thereof.

Returning now to step 1035, responsive to process 1000 aborting the verification process ("abort" at step 918), process 1000 aborts the verification process (step 1050). Process 1000 terminates thereafter.

Returning now to step 1035, responsive to process 1000 proceeding with the verification process ("proceed" at step 1035), process 1000 instantiates the non-authentic virtual machine image (step 1055). Process 1000 terminates thereafter.

The illustrative embodiment described herein provides for an Image Distribution Network that overcomes the limitations of traditional content delivery networks and peer-to-peer networks in the delivery of large virtual machine images. The Image Distribution Network is aware of data similarity between Virtual Machine imagers, and as such can reduce redundant downloads of the same data across different virtual machine images. The Image Distribution Network is amendable to partial download of virtual machines images, so that virtual machines can run without the need for fill download of their respective virtual machine images. Furthermore, the Image Distribution Networks aware of data access patterns for virtual machine images, so that virtual machines can be instantiated faster than serial download of virtual machine images over a traditional content distribution network or peer-to-peer network.

The illustrative embodiment described herein addresses security and authentication issues of image content located at different hypervisor nodes, and the mechanisms to validate content before used for provisioning of virtual machines.

The illustrative embodiment described herein enables authenticated distribution of complete virtual images, and parts of virtual images. A virtual machine image creator computes signatures of images with or without the signatures of authenticated components. The computed signature enables signing images based on the semantics, structure, representation, distribution and provisioning schemes. A catalog server computes and stores signatures for part(s) of images to be distributed.

In order to ensure authentication, verification of authenticity can be performed both before and after streaming large images/part(s). Thus, due to the enablement of signing catalog entries clients can verify authenticity of catalog results. A client can verify authenticity of results containing catalog entries.

Virtual Machine Image provisioning is important in the context of cloud enablement. The amount of time and network bandwidth it requires in order to instantiate a virtual machine image in a given setup and data center location depends on the scheme used to distribute the virtual machine images. There are two such schemes: flat file-based schemes, and chunk-based schemes, in which chunks of a virtual machine image maybe received from several peers or systems in order minimize network and distribution cost and latency.

When virtual machine images are shared between peers, it is important to verify that the image has not been modified in an unauthorized manner and is originated from an authorized source. The threat of an image that originates from an unauthorized/malicious entity, or of an image that has been modified in an unauthorized manner—with code injection, or bugs that have been introduced—should be minimized.

One such manner of image verification is through a digital signature utilizing a computation of hashes. In one such embodiment, a hash of a virtual machine image being distributed in chunks is created using a Merkle hash technique.

Computation of signatures: Digital signature of a VM image is computed by signing the Merkle hash or using an aggregate signature such as the Condensed-RSA or Elliptic Curve based aggregate signatures.

Verification of authenticity: Authenticity is verified by validating the signature of the VM image. A virtual machine image can be either represented as a flat file or as a list of chunks. The chunks maybe of uniform sizes or of different sizes. In an illustrative embodiment, a flat file-based virtual machine is either distributed as a whole or not at all distributed to a client. In a flat file-based virtual machine image, an illustrative embodiment computes a hash in a manner similar to computing the hash of a string. In an illustrative embodiment, for a virtual machine that is distributed in chunks, an illustrative embodiment creates a Merkle hash tree with each chunk as a leaf.

For purposes of establishing integrity of the virtual machine image, if it is not essential to authenticate the origin of the VM image, then integrity of the received image can be carried out by computing the hash of the received image. the hash of the received image is then matched to a published hash of the image.

For purposes of establishing integrity of the virtual machine image, it is essential to authenticate the origin of the virtual machine image as well as verify the integrity of the received virtual machine image. In such a scenario, the digital signature of the VM image is computed. The digital signature is then used to verify authenticity of the image.

Flat file-based virtual machine images are either distributed as a whole or not at all distributed to a client: Compute the signature of the virtual machine image, by signing its hash using redactable signature algorithm or some other signature scheme. Verification of the signature is carried out as per the signature protocol.

In one illustrative embodiment, for chunk-based virtual machine image distribution, verification of the signature is carried out though a signature and verification of a Merkle hash. A Merkle hash of the virtual machine image is signed. That signature is later verified in order to validate authenticity of the virtual machine image.

In one illustrative embodiment, for chunk-based virtual machine image distribution, verification of the signature uses an aggregate signature scheme such as condensed redactable signature algorithm or Elliptic curve based scheme. The aggregate signature scheme computes the aggregate signature of the image. A provisioning service receiving the chunks of a virtual machine image also receives the aggregate signature for the virtual machine image. The provisioning service follows the aggregate signature protocol in order to verify the authenticity of the chunks of the virtual machine image.

Thus, illustrative embodiments of the present invention provide a computer implemented method and computer program product for distributing a virtual machine image. A request for a virtual machine image is received. Responsive to receiving the request or the virtual machine image, the authenticity of a virtual machine image catalog associated with the virtual machine image is identified. Responsive to identifying that the virtual machine image catalog is authentic, a first digital signature to be sent with the virtual machine image is determined. Responsive to determining the signature, the virtual machine image and the signature is sent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen best to explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for distributing a virtual machine image, the computer implemented method comprising:
dividing the virtual machine image into a plurality of chunks using operating system files of the virtual machine image as the plurality of chunks;
representing the plurality of chunks of the virtual machine image as a tree, wherein each chunk of the plurality of chunks is a leaf of the tree;
signing the tree representing the plurality of chunks of the virtual machine image with a digital signature;
receiving a request for the virtual machine image from a client;
responsive to receiving the request for the virtual machine image, identifying whether a virtual machine image catalog containing the virtual machine image is authentic;
responsive to identifying that the virtual machine image catalog is authentic, determining a type of digital signature to send with the virtual machine image;
responsive to determining the type of digital signature to send with the virtual machine image, sending the virtual machine image and the type of digital signature to a hypervisor, wherein the hypervisor uses the virtual machine image to provision a virtual machine to execute; and
responsive to identifying that the virtual machine image catalog is not authentic, adding the virtual machine image to a non-authentic virtual machine image catalog containing virtual machine images that are not authenticated.

2. The computer implemented method of claim 1, wherein the virtual machine image catalog containing the virtual machine image is identified as authentic by verifying a digital signature of the virtual machine image catalog.

3. The computer implemented method of claim 2, further comprising: further responsive to identifying that the virtual machine catalog is authentic, identifying whether the virtual machine image is authentic.

4. The computer implemented method of claim 3, wherein the virtual machine image is identified as authentic by verifying the digital signature of the tree representing the plurality of chunks of the virtual machine image.

5. The computer implemented method of claim 4, further comprising: responsive to identifying that the virtual machine image is not authentic, instantiating a non-authentic image of the virtual machine image.

6. The computer implemented method of claim 1, wherein the type of digital signature is selected from a group consisting of an existing digital signature of the tree representing the plurality of chunks of the virtual machine image, a redacted digital signature of the tree representing the plurality of chunks of the virtual machine image, an aggregated digital signature of the tree representing the plurality of chunks of the virtual machine image, and a sanitized digital signature of the tree representing the plurality of chunks of the virtual machine image.

7. The computer implemented method of claim 1, wherein chunks of the plurality of chunks of the virtual machine image are of different sizes.

8. The computer implemented method of claim 1, further comprising: dividing the virtual machine image into the plurality of chunks based on byte-sequences of the virtual machine image having certain properties that are used to mark beginnings of new chunks within the plurality of chunks.

9. A computer program product for distributing a virtual machine image, the computer program product comprising:
a computer readable hardware storage medium having computer readable program code embodied therewith, the computer readable program code comprising:

computer readable program code configured to divide the virtual machine image into a plurality of chunks using operating system files of the virtual machine image as the plurality of chunks;

computer readable program code configured to represent the plurality of chunks of the virtual machine image as a tree, wherein each chunk of the plurality of chunks is a leaf of the tree;

computer readable program code configured to sign the tree representing the plurality of chunks of the virtual machine image with a digital signature;

computer readable program code configured to receive a request for the virtual machine image from a client;

computer readable program code configured, responsive to receiving the request for the virtual machine image, to identify whether a virtual machine image catalog containing the virtual machine image is authentic;

computer readable program code configured, responsive to identifying that the virtual machine image catalog is authentic, to determine a type of digital signature to send with the virtual machine image;

computer readable program code configured, responsive to determining the type of signature to send with the virtual machine image, to send the virtual machine image and the type of signature to a hypervisor, wherein the hypervisor uses the virtual machine image to provision a virtual machine to execute; and computer readable program code configured, responsive to identifying that the virtual machine image catalog is not authentic, to add the virtual machine image to a non-authentic virtual machine image catalog containing virtual machine images that are not authenticated.

10. The computer program product of claim 9, wherein the virtual machine image catalog containing the virtual machine image is identified as authentic by verifying a digital signature of the virtual machine image catalog.

11. The computer program product of claim 10, further comprising: computer readable program code configured, further responsive to identifying that the virtual machine catalog is authentic, to identify whether the virtual machine image is authentic.

12. The computer program product of claim 11, wherein the virtual machine image is identified as authentic by verifying the digital signature of the tree representing the plurality of chunks of the virtual machine image.

13. The computer program product of claim 12, further comprising: computer readable program code configured, responsive to identifying that the virtual machine image is not authentic, to instantiate a non-authentic image of the virtual machine image.

14. The computer program product of claim 9, wherein the type of digital signature is selected from a group consisting of an existing digital signature of the tree representing the plurality of chunks of the virtual machine image, a redacted digital signature of the tree representing the plurality of chunks of the virtual machine image, an aggregated digital signature of the tree representing the plurality of chunks of the virtual machine image, and a sanitized digital signature of the tree representing the plurality of chunks of the virtual machine image.

15. A computer comprising:

a bus;

a storage connected to the bus, the storage containing computer readable program code for distributing a virtual machine image; and a processor connected to the bus, wherein the processor executes the computer readable program code: to divide the virtual machine image into a plurality of chunks using operating system files of the virtual machine image as the plurality of chunks; to represent the plurality of chunks of the virtual machine image as a tree, wherein each chunk of the plurality of chunks is a leaf of the tree; to sign the tree representing the plurality of chunks of the virtual machine image with a digital signature; to receive a request for the virtual machine image from a client; responsive to receiving the request for the virtual machine image, to identify whether a virtual machine image catalog containing the virtual machine image is authentic; responsive to identifying that the virtual machine image catalog is authentic, to determine a type of digital signature to send with the virtual machine image; responsive to determining the type of signature to send with the virtual machine image, to send the virtual machine image and the type of signature to a hypervisor, wherein the hypervisor uses the virtual machine image to provision a virtual machine to execute; and responsive to identifying that the virtual machine image catalog is not authentic, to add the virtual machine image to a non-authentic virtual machine image catalog containing virtual machine images that are not authenticated.

16. The computer of claim 15, wherein the virtual machine image catalog containing the virtual machine image is identified as authentic by verifying a digital signature of the virtual machine image catalog.

17. The computer of claim 16, wherein the processor further executes the computer readable program code: further responsive to identifying that the virtual machine catalog is authentic, to identify whether the virtual machine image is authentic.

18. The computer of claim 17, wherein the virtual machine image is identified as authentic by verifying the digital signature of the tree representing the plurality of chunks of the virtual machine image.

19. The computer of claim 18, wherein the processor further executes the computer readable program code:

responsive to identifying that the virtual machine image is not authentic, to instantiate a non-authentic image of the virtual machine image.

20. The computer of claim 15, wherein the type of digital signature is selected from a group consisting of an existing digital signature of the tree representing the plurality of chunks of the virtual machine image, a redacted digital signature of the tree representing the plurality of chunks of the virtual machine image, an aggregated digital signature of the tree representing the plurality of chunks of the virtual machine image, and a sanitized digital signature of the tree representing the plurality of chunks of the virtual machine image.

* * * * *